April 8, 1930. C. J. NASH 1,753,937
SHOCK ABSORBER
Filed Nov. 22, 1928 2 Sheets-Sheet 1

Inventor:
Charles J. Nash
By Gillson, Mann & Cot Attys.

April 8, 1930.     C. J. NASH     1,753,937
SHOCK ABSORBER
Filed Nov. 22, 1928     2 Sheets-Sheet 2
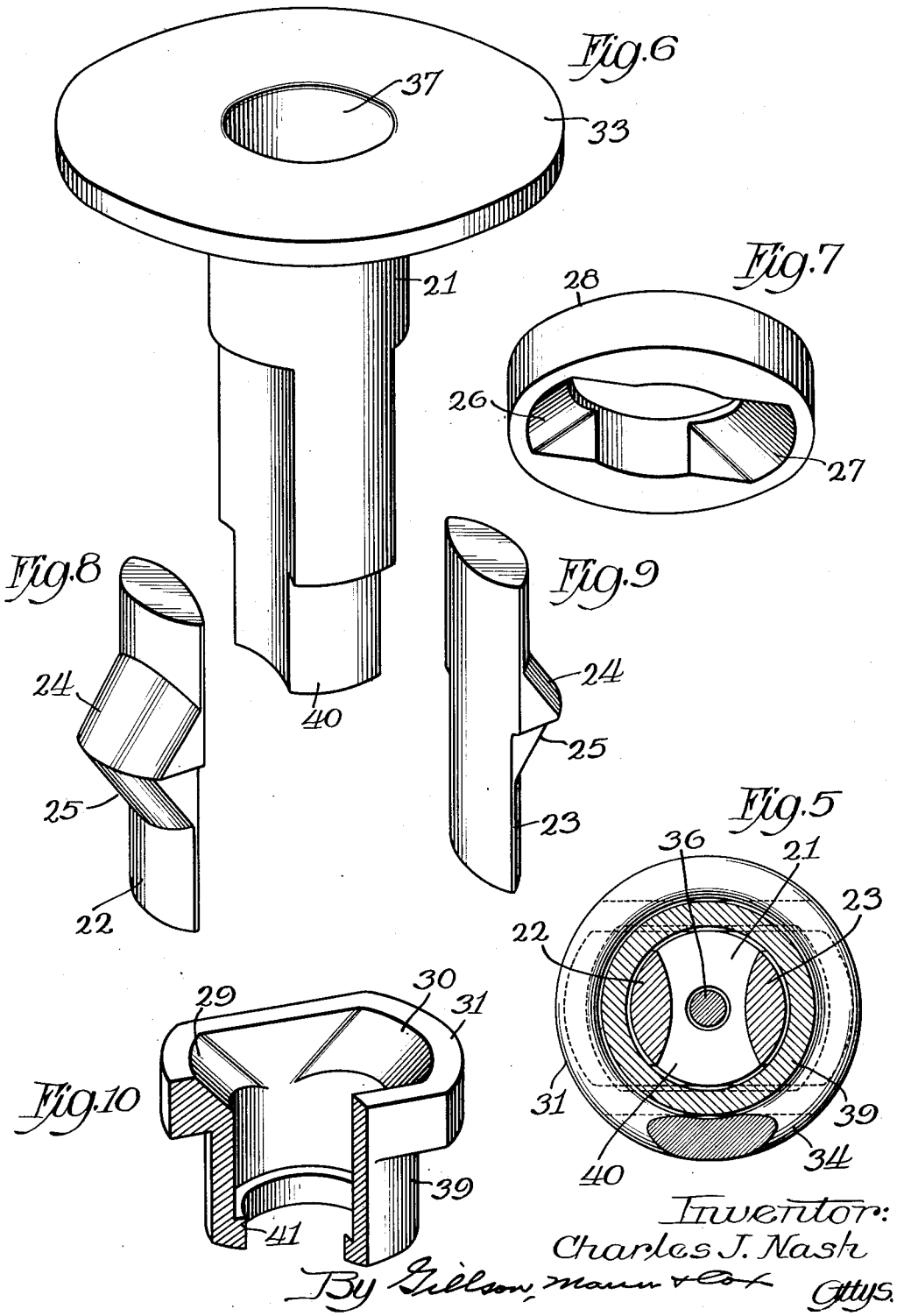

Patented Apr. 8, 1930

1,753,937

UNITED STATES PATENT OFFICE

CHARLES J. NASH, OF CHICAGO, ILLINOIS, ASSIGNOR TO UNIVERSAL DRAFT GEAR ATTACHMENT CO., A CORPORATION OF ILLINOIS

SHOCK ABSORBER

Application filed November 22, 1928. Serial No. 321,054.

The invention relates to shock absorbers embodying friction elements, and is especially adapted for supporting, and is shown in connection with, railway car bolsters.

It has been the usual practice to interpose between the bolsters of railway cars and the lower arch of the side frame of the car truck a plurality of helical springs, though to some extent friction devices have been used. With heavy cars, and especially when carrying weighty lading, springs alone are found to be inadequate to prevent injury to the car and to the lading from severe shocks. The damage is done not only by the jarring incident to the initial action, but to the violent recoil of the springs after compression.

Among the objects of the present invention are to provide for augmented frictional resistance to the severe shocks, with frictional resistance gradually diminishing on the recoil; and for the application of the friction resistance only upon the occurrence of the more severe shocks, the load being carried and the lighter shocks being resisted by the springs.

While the invention may be applied in other forms, a desirable embodiment of it is hereinafter described and is illustrated in the accompanying drawings in which—

Figure 2:
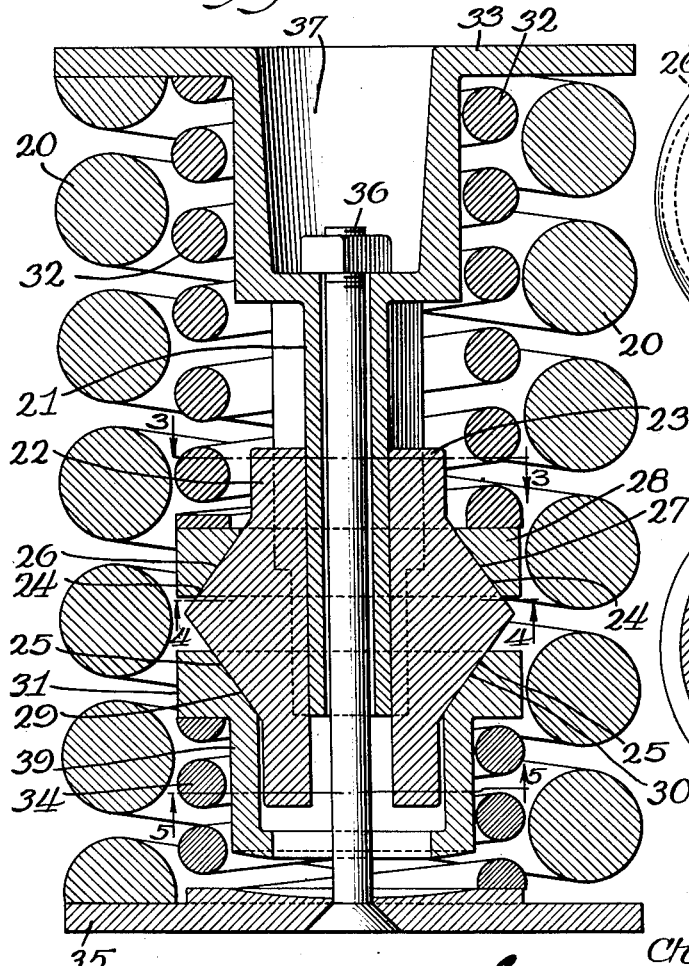
Fig. 2 is a central, longitudinal section of the improved supporting device.
Figure 3:
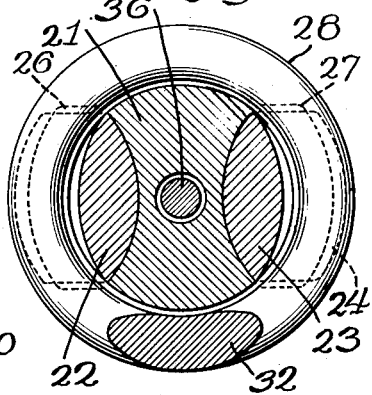
Figure 4:
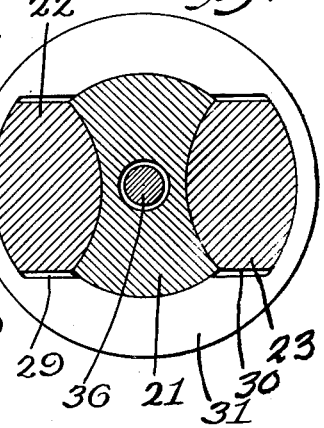

Figs. 3, 4 and 5 are detail sections, respectively, on lines 3—3, 4—4 and 5—5 of Fig. 2;

Figs. 6, 7, 8 and 9 are views in perspective of various of the friction elements of the device; and Fig. 10 is a view in perspective and partly in section of one of the friction elements.

Figure 1:
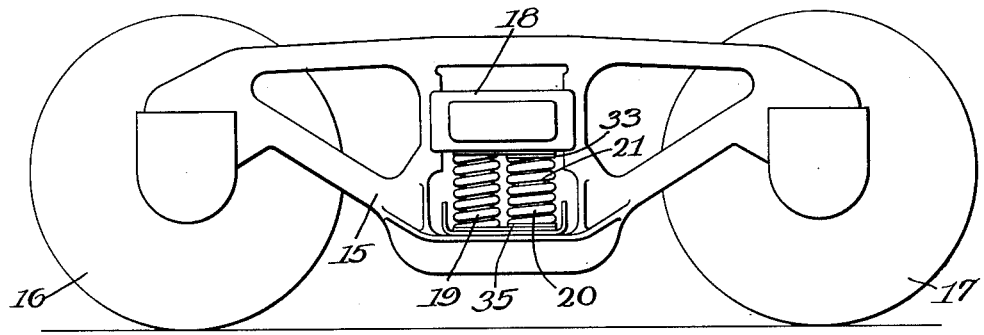
Fig. 1 is a detail, side elevation of a car truck.

In Fig. 1, there is shown a side frame 15 of a car truck of conventional form mounted upon a pair of wheels 16, 17. The body bolster 18 is located as usual between a pair of pedestals of the framing 15 and is capable of vertical movement with reference thereto. A pair of helical springs 19, 20 is shown as interposed between the bolster and the bottom arch of the frame 15 though, in practice, a greater number of springs is frequently used. The present invention is incorporated in one or more of the springs, being shown in connection with the spring 20.

A central friction bar 21 cooperates with a pair of friction shoes 22, 23, each having on its outer face a pair of oppositely directed wedge surfaces 24, 25, which cooperate, respectively, with the pair of wedge surfaces 26, 27, formed on the inner side of a collar 28, and with a pair of similar wedging surfaces 29, 30, formed within a collar 31.

A helical spring 32 reacts between the collar 28 and a flange 33 extending outwardly from the upper end of the bar 21, and upon which the bolster 18 may directly rest; and a helical spring 34 reacts between the collar 31 and a plate 35, which is tied to the bar 21 by means of a limiting bolt 36, extending axially through the bar and into the chamber 37 of an enlargement of its upper end. The depth of this chamber is such that upon complete compression of the device the bolt will not project from it.

A helical spring 20 encloses the friction and spring elements just described, and preferably reacts between the flange 33 and the plate 35. This spring preferably constitutes one of the set of bolster springs usually employed, and may, if desired, seat directly against the bolster and the lower arch of the truck frame. Preferably, however, this outer spring is assembled with the other parts of the device, as shown in Fig. 2, and with them constitutes a shock absorbing unit. Obviously also the plate 36 might be dispensed with, the springs seating directly against the bolster arch and the bolt 36 extending therethrough. However, by making the complete device as a unit, its manufacture, shipment, installation and replacement are greatly facilitated.

The several wedging faces of the shoes and collars are sections of cylinders, all of the elements of their surfaces being of equal radial distances from the center of curvature in order that the surfaces of cooperating wedges may be continuously in full engagement.

The collar 31 has a downwardly extending annular flange 39 adapted for engagement as a limiting stop with the plate 35. The lower end portion 40 of the bar 21 is of reduced diameter to fit within the flange 39 and the latter is provided adjacent its lower end with an instanding shoulder 41, giving an increased bearing surface on the plate 35.

Normally the parts occupy the positions as shown in Fig. 2 regardless of the load except that the weight of the car and its lading will somewhat compress the springs and carry downwardly the bar 21.

The light shocks are sustained by the springs, the shoes and the bar 21 moving together. Heavier shocks are resisted primarily by the springs until the flange 39 makes contact with the plate 35, whereupon the shoes are arrested in their downward movement and are compressed upon the bar 21, developing friction which is augmented continuously throughout the remainder of the downstroke which is arrested thereby. The recoil is checked at the outset by the maximum friction which has been developed, but which friction gradually decreases, permitting the parts to return slowly to normal position. The car and its lading are thus protected, the forces developed by the severe shocks being absorbed by the supporting mechanism.

Desirably the friction faces as 38 of the bar 21 are concave and the surfaces of the shoes 22, 23 cooperating therewith are of complementary form, thereby preventing the accidental lateral displacement of the parts. Obviously the parts 21 to 36 will cooperate with the heavy bolster springs whether they be enclosed within or be entirely outside of them.

Various changes may be made within the scope of the invention as defined in appended claims.

I claim as my invention:

1. In a shock absorber in combination, a central friction bar, friction shoes engageable with the bar and each having oppositely inclined wedge faces, wedge elements cooperating with the wedge faces of the shoes, means resisting outward lateral movement of the wedge elements, springs bearing upon both sets of wedge elements, and means against which the springs react.

2. In a shock absorber in combination, a central friction bar, friction shoes engageable with the bar and each having oppositely inclined wedge faces, wedge elements cooperating with the wedge faces of the shoes, means resisting outward lateral movement of the wedge elements, springs bearing upon both sets of wedge elements, means against which the springs react, the springs being differentiated in strength, and means for positively arresting the wedge elements cooperating with the weaker spring.

3. In a shock absorber in combination, a central friction bar having a lateral flange at one end, a plate facing the opposite end of the bar, a member connecting the bar and plate and permitting their relative approach, friction shoes on opposite sides of the bar, wedge means for pressing the shoes against the bar, a spring reacting between the bar flange and the wedge means, and a spring seated on the plate and opposing the advance of the shoes.

4. In a shock absorber in combination, a central friction bar having a lateral flange at one end, a plate facing the opposite end of the bar, a member connecting the bar and plate and permitting their relative approach, friction shoes on opposite sides of the bar, wedge means for pressing the shoes against the bar, a spring reacting between the bar flange and the wedge means, and a spring of less strength than the first named spring seated on the plate and opposing the advance of the shoes.

5. In a shock absorber in combination, a central friction bar having a lateral flange at one end, a plate facing the opposite end of the bar, a member connecting the bar and plate and permitting their relative approach, friction shoes on opposite sides of the bar, wedge means for pressing the shoes against the bar, a spring reacting between the bar flange and the wedge means, a spring seated on the plate and opposing the advance of the shoes, and a positive stop for limiting the advance of the shoes.

6. In a shock absorber in combination, a central friction bar having a lateral flange at one end, a plate facing the opposite end of the bar, a member connecting the bar and plate and permitting their relative approach, friction shoes on opposite sides of the bar, wedge means for pressing the shoes against the bar, a spring reacting between the bar flange and the wedge means, a spring seated on the plate and opposing the advance of the shoes, and a spring reacting between the bar flange and the plate.

7. A car bolster support comprising a central friction bar movable with the bolster, friction shoes cooperating with opposite sides of the bar, wedge means for forcing the shoes against the bar, a spring reacting between the bolster and the wedge means, a spring of less strength for resisting the advance of the shoes, a positive stop for arresting the shoes on compression of the weaker spring, and a spring for reacting between bolster and a lower portion of a bolster carrying frame.

8. In a shock absorber, in combination, a pair of opposed followers, a friction bar movable with one of the followers, friction shoes engageable with opposite faces of the bar and each having oppositely inclined wedge faces, wedge elements cooperating with the wedge faces of the shoes, means resisting outward lateral movement of the wedge elements, and springs reacting between the wedge elements and the followers.

In testimony whereof I affix my signature.

CHARLES J. NASH.